United States Patent
Raybon et al.

(10) Patent No.: US 9,481,104 B2
(45) Date of Patent: Nov. 1, 2016

(54) SYSTEM AND METHOD FOR DOUBLE EVEN ENDING LUMBER

(71) Applicant: Baxley Equipment Co., Hot Springs, AR (US)

(72) Inventors: Chris Raybon, Hot Springs, AR (US); Russell Kennedy, Hot Springs, AR (US); Pat Conry, Hot Springs, AR (US)

(73) Assignee: BAXLEY EQUIPMENT CO., Hot Springs, AR (US)

( * ) Notice: Subject to any disclaimer, the term of this patent is extended or adjusted under 35 U.S.C. 154(b) by 749 days.

(21) Appl. No.: 13/967,954

(22) Filed: Aug. 15, 2013

(65) Prior Publication Data

US 2014/0048178 A1   Feb. 20, 2014

Related U.S. Application Data

(60) Provisional application No. 61/684,529, filed on Aug. 17, 2012.

(51) Int. Cl.
| | |
|---|---|
| *B65G 47/26* | (2006.01) |
| *B27B 31/00* | (2006.01) |
| *B23Q 7/16* | (2006.01) |
| *B65G 47/84* | (2006.01) |

(52) U.S. Cl.
CPC .............. *B27B 31/003* (2013.01); *B23Q 7/16* (2013.01); *B65G 47/26* (2013.01); *B65G 47/841* (2013.01); *Y10T 83/22* (2015.04)

(58) Field of Classification Search
CPC ......... B23Q 7/16; B27B 25/04; B27B 27/02; B27B 31/00; B27B 31/003; B27B 31/006; B07C 5/14; B65G 47/26; B65G 47/841; B65G 47/844; Y10T 83/0467; Y10T 83/2087; Y10T 83/2192; Y10T 83/22; Y10T 83/2209; Y10T 83/2211
USPC ......... 198/456, 457.01; 83/23, 27, 102, 107, 83/155, 158, 162

See application file for complete search history.

(56) References Cited

U.S. PATENT DOCUMENTS

| | | | | |
|---|---|---|---|---|
| 3,557,952 A | * | 1/1971 | Heikinheimo | B07C 5/14 209/521 |
| 3,638,792 A | * | 2/1972 | Bilocq | B27B 31/003 144/245.2 |
| 3,937,114 A | * | 2/1976 | Joensson | B07C 5/14 144/379 |
| 4,120,333 A | * | 10/1978 | Hellgren | B27B 5/228 144/242.1 |
| 4,650,061 A | * | 3/1987 | Hasenwinkle | B27B 31/00 198/462.3 |
| 5,390,778 A | * | 2/1995 | Ritola | B23Q 7/16 144/248.2 |
| 5,617,910 A | * | 4/1997 | Hill | B27B 25/04 144/2.1 |
| 6,892,614 B2 | | 5/2005 | Olsen | |
| 2003/0183052 A1 | | 10/2003 | Olsen | |
| 2007/0017780 A1 | * | 1/2007 | Faucher | B65G 47/26 198/456 |

* cited by examiner

*Primary Examiner* — Mark A Deuble

(74) *Attorney, Agent, or Firm* — Jeffrey S. Melcher; Manelli Selter PLLC

(57) ABSTRACT

Provided are a system and method for cutting boards into two board pieces, even ending one of the board pieces at a first side while travelling transversely on a conveyor and even ending the other board piece at a second side of the conveyor.

6 Claims, 3 Drawing Sheets

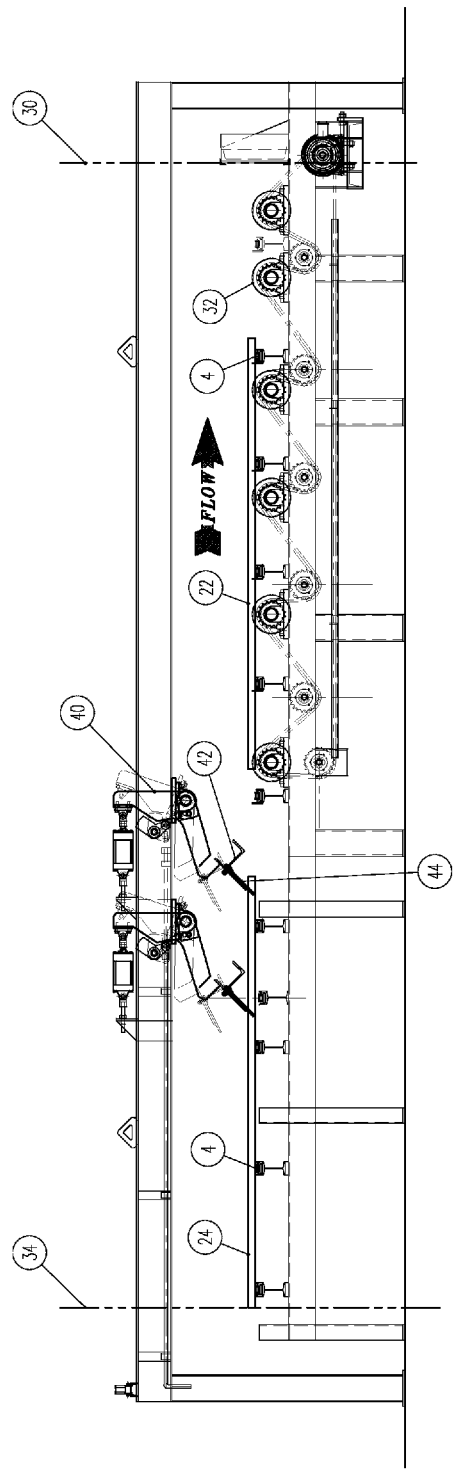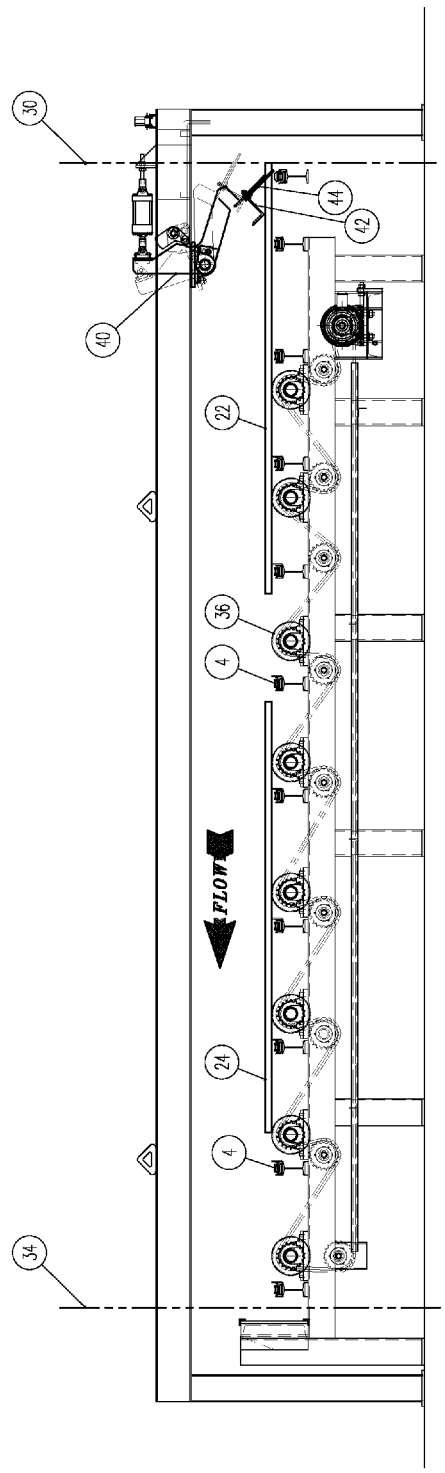
FIG. 2
FIG. 3

SYSTEM AND METHOD FOR DOUBLE EVEN ENDING LUMBER

This application claims priority to U.S. provisional patent application No. 61/684,529, filed 17 Aug. 2012, the complete disclosure of which is incorporated herein by reference.

FIELD OF THE INVENTION

The invention relates to a system and method for cutting boards into two board pieces, even ending one of the board pieces at a first side while travelling transversely on a conveyor and even ending the other board piece at a second side of the conveyor.

BACKGROUND OF THE INVENTION

It is common for lumber to be cut into two pieces transversely, i.e. 2×4×20' cut into 2–2×4×10', to improve the overall grade and therefore value. An example is a board that has knots or other defects in one end, but not the other end. Cutting into two shorter boards keeps the defects in one segment from devaluing the other segment.

Typically, lumber cut in this manner in automated lumber handling systems require one part to be diverted to another system or one of the two boards to be relocated to an empty lug for handing. A common method to relocate is for the control system to recognize the need and to interrupt the feeding process to allow an empty lug to be developed right behind the lug containing the board needing to be relocated and arms used to lift one portion over the lugs and into the empty lug space. The creation of the empty lug amounts to loss of opportunity and the related lost production. There have been methods devised in an attempt to solve this problem, that require each board to be acted upon individually, causing complexity in controls and mechanical systems, limiting the speed possible and increasing the cost.

An example of prior art cutting systems shown in U.S. Pat. No. 6,892,614 (Olsen), issued, 17 May 2005, and U.S. Published Patent Application No. 2003/0183052 (Olsen), published 2 Oct. 2003, the complete disclosures of which are incorporated herein by reference.

SUMMARY OF THE INVENTION

An objective of the invention is to provide an efficient system and method in which the two portions of the cut in two board remains on their original now shared lug space, but each piece is even ended so that they can be sorted or other manufacturing process performed independently. Due to length variation of the boards, it is required that the boards be even ended to an index point to allow automated handing and processing.

Provided is a double even ending board cutting system comprising:
  a conveyor comprising an endless chain loop having lugs constructed to convey un-cut boards and boards cut into first and second board pieces transversely, the first conveyor having a first side index line and a second side index line;
  a first section of the conveyor comprising a plurality of first powered rollers constructed to move first board pieces travelling on the conveyor to the first side index line to even end first board pieces at the first side index line traveling through the first section;
  a second section of the conveyor comprising a plurality of second powered rollers constructed to move second board pieces travelling on the conveyor to the second side index line to even end second board pieces at the second side index;
  and
  an overhead hold back constructed to hold the second board pieces in place on the traveling conveyor while the first board pieces are being moved by the first powered rollers and to hold the first board pieces in place while the second board pieces are being moved by the second powered rollers.

Also provided is a method of double even ending boards comprising:
  conveying a first board piece and a second board piece transversely on a conveyor comprising an endless chain loop having lugs, the first conveyor having a first side index line and a second side index line;
  using a plurality of first powered rollers located in a first section of the conveyor to move the first board piece to the first side index line to even end the first board piece, using an overhead hold back to hold the second board piece and any uncut boards in place while the first board piece is being moved; and
  using a plurality of second powered rollers located in a second section of the conveyor to move the second board piece to the second side index line to even end the second board piece, using the overhead hold back to hold the first board piece in place while the second board piece and any uncut boards are being moved.

BRIEF DESCRIPTION OF THE DRAWINGS

FIG. 2 illustrates a side view of section B of the system.
FIG. 3 illustrates a side view of section C of the system.

DETAILED DESCRIPTION OF PREFERRED EMBODIMENTS

Figure 1:
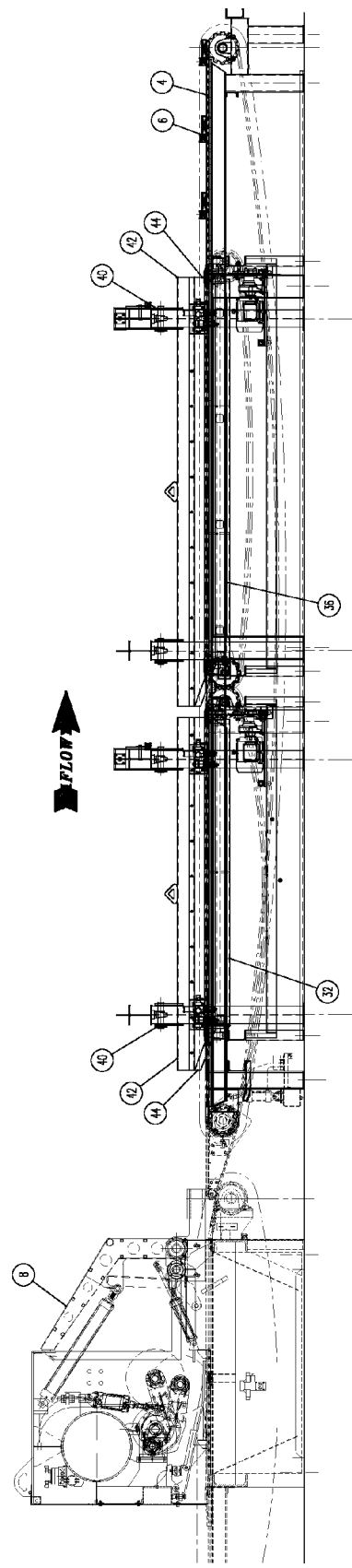
FIG. 1 illustrates a side view of section A of the system.
Figure 4:
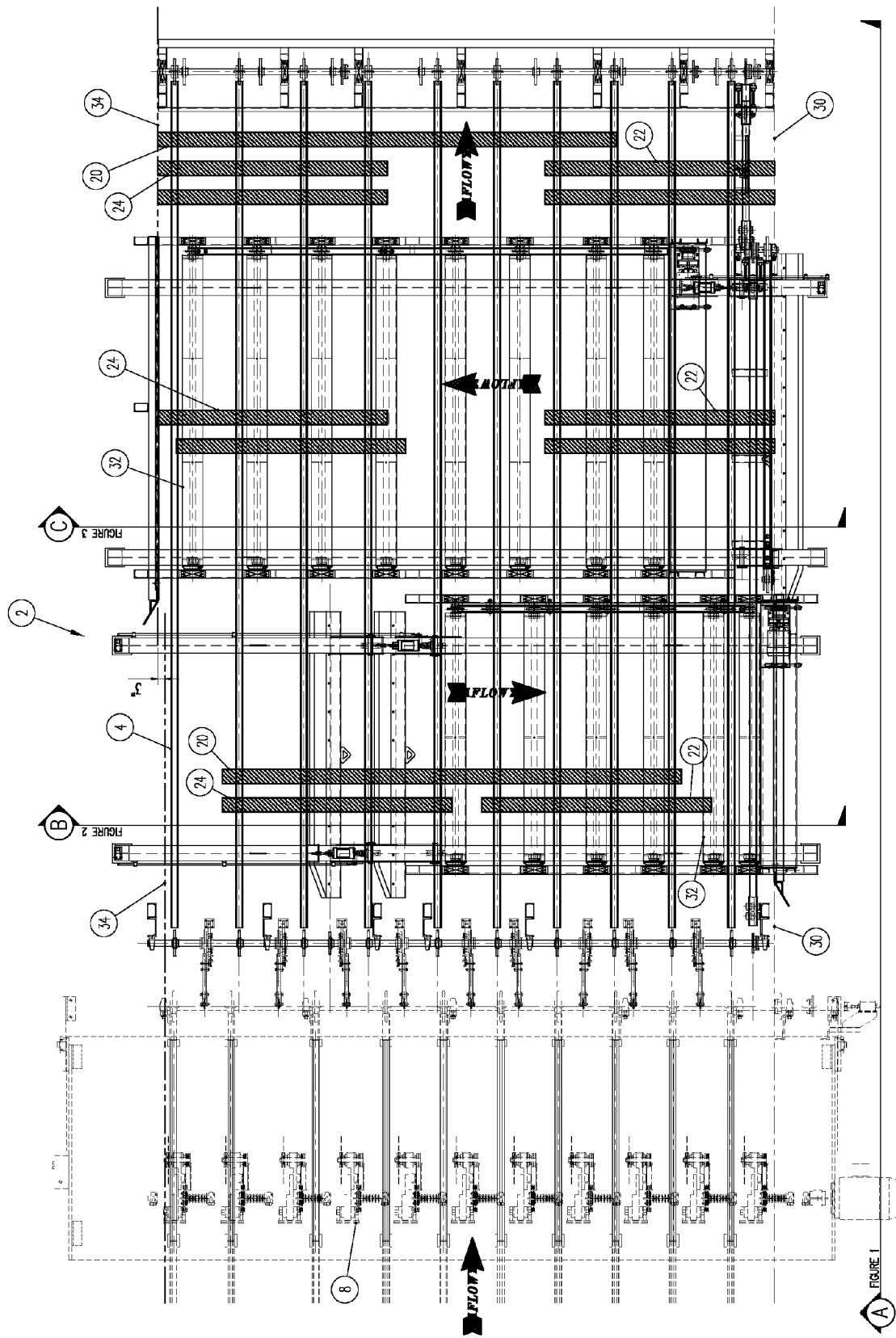
FIG. 4 illustrates a top view of the system.

The system and method to even end each end of a cut in two board to opposite even ends of the system without needing electronic controls or complicated mechanical systems will be described with reference to the attached non-limiting Figures.

The system comprises a conveyor 2 having a plurality of lugged chains 4 with lugs 6 attached driven in such a way as to convey boards 20 transversely. The system further comprises a cutter 8 constructed to cut the boards 20 into first board pieces 22 and second board pieces 24. The conveyer 2 has a first index line 30 on a first side, such as a far side, and a second index line 34 on a second side, such as a near side.

A first section B, shown in FIG. 2, of the conveyor comprises a series of first powered rollers 32 to propel the first board piece 22 to the first index 30 while the piece 22 is traveling on the chains 4 over the rollers 32. These rollers 32 are directed to even end the first board pieces 22 to the first side index line 30. An overhead hold back device 40 is constructed to hold the second board pieces 24 and uncut boards 20 in place on the chains 4 (i.e. the second board pieces 24 and uncut boards 20 continue to travel with the chains 4 but are not moved in relation to the sides of the conveyor 2) while the first board pieces 22 are even ended at the first index line 30 by the first rollers 32.

The hold back device 40 employs, for example, a rigid support member 42 running in the direct of lumber flow with a flexible portion 44 attached. This flexible portion 44 is angled to and in contact with the second board pieces 24 and uncut boards 20 to prevent them from moving in the direction to the far end index line 30 but allowing them to be propelled by the chains 4 in the chain flow direction. This flexible member 44 can be as long as the rollers 32 and in contact with a multiple of boards 24 and 20 of varying sizes effectively preventing them from changing their location in a side-to-side direction. Exiting this first section B far end cut in two boards 22 have been positioned to the first index line 30 and all others (un cut boards 20 and near end cut in two boards 24) have not moved from their original location relative to the sides of the conveyor 2.

It is envisioned that the system can work without the flexible member 44 being angled. Also, an opposing member underneath the lumber powered or unpowered may be used to improve the performance of the hold back device 40.

A second section C, shown in FIG. 3, of the conveyor 2 is much like the first section B, with a plurality of second rollers 36 operating in the opposite direction as the first rollers 32, i.e. toward the second index line 34. In the second section C, the second board pieces 24 and uncut boards 20 are moved by the second rollers 36 towards the second index line 34 to even end the second board pieces 24 at the second index line 34. The overhead hold back device 40 is constructed to hold the first board pieces 22 in place on the chains 4 while the second board pieces 24 and uncut board pieces 20 are even ended at the second index line 34 by the second rollers 36.

In this embodiment, the rollers 32 and 36 remain running as long as the chain 4 is running, thus not requiring a control system. However, a control system can be used if desired to control the rollers 32 and 36 and chain 4.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention. Therefore, it is intended that the invention not be limited to the particular embodiments disclosed as the best mode contemplated for carrying out this invention, but that the invention will include all embodiments falling within the scope and spirit of the appended claims.

The invention claimed is:

1. A double even ending board cutting system comprising:
    a conveyor comprising an endless chain loop having lugs constructed to convey un-cut boards and boards cut into first and second board pieces transversely, the first conveyor having a first side index line and a second side index line;
    a first section of the conveyor comprising a plurality of first powered rollers constructed to move first board pieces travelling on the conveyor to the first side index line to even end first board pieces at the first side index line traveling through the first section;
    a second section of the conveyor comprising a plurality of second powered rollers constructed to move second board pieces travelling on the conveyor to the second side index line to even end second board pieces at the second side index;
    and
    an overhead hold back constructed to hold the second board pieces in place on the traveling conveyor while the first board pieces are being moved by the first powered rollers and to hold the first board pieces in place while the second board pieces are being moved by the second powered rollers.

2. The double even ending board cutting system according to claim 1, wherein the overhead hold back is constructed to hold uncut boards in place in the first section and allow the uncut boards to be moved by the second rollers in the second section.

3. The double even ending board cutting system according to claim 1, further comprising a board cutter for cutting boards into first and second board pieces.

4. A method of double even ending boards comprising:
    conveying a first board piece and a second board piece transversely on a conveyor comprising an endless chain loop having lugs, the first conveyor having a first side index line and a second side index line;
    using a plurality of first powered rollers located in a first section of the conveyor to move the first board piece to the first side index line to even end the first board piece, using an overhead hold back to hold the second board piece and any uncut boards in place while the first board piece is being moved; and
    using a plurality of second powered rollers located in a second section of the conveyor to move the second board piece to the second side index line to even end the second board piece and any uncut boards, using the overhead hold back to hold the first board piece in place while the second board piece and any uncut boards are being moved.

5. The method according to claim 4, further comprising using the plurality of second powered rollers located in a second section of the conveyor to move an un-cut board to the second side index line to even end the uncut board.

6. The method according to claim 4, further comprising cutting a board into the first and second board pieces.

* * * * *